US009549325B2

United States Patent
Huh et al.

(10) Patent No.: US 9,549,325 B2
(45) Date of Patent: Jan. 17, 2017

(54) SYSTEM AND METHOD FOR CONTROLLING SECURITY OF BEACON AND CONTROL DEVICE THEREOF

(71) Applicant: SK PLANET CO., LTD., Gyeonggi-Do (KR)

(72) Inventors: Jaehyung Huh, Gyeonggi-Do (KR); Chulyong Shin, Seoul (KR)

(73) Assignee: SK PLANET CO., LTD. (KR)

( * ) Notice: Subject to any disclaimer, the term of this patent is extended or adjusted under 35 U.S.C. 154(b) by 121 days.

(21) Appl. No.: 14/524,131

(22) Filed: Oct. 27, 2014

(65) Prior Publication Data

US 2015/0271674 A1   Sep. 24, 2015

(30) Foreign Application Priority Data

Mar. 21, 2014   (KR) .................. 10-2014-0033533

(51) Int. Cl.
*H04W 12/08* (2009.01)
*H04W 4/00* (2009.01)

(52) U.S. Cl.
CPC ............. *H04W 12/08* (2013.01); *H04W 4/008* (2013.01); *H04L 2463/102* (2013.01)

(58) Field of Classification Search
USPC ....................................................... 455/41.2
See application file for complete search history.

(56) References Cited

U.S. PATENT DOCUMENTS

| 2010/0266125 | A1* | 10/2010 | Tanaka | H04W 8/205 380/270 |
| 2013/0149966 | A1* | 6/2013 | Lee | H04W 12/08 455/41.2 |
| 2013/0272224 | A1* | 10/2013 | Ogawara | H04W 76/021 370/329 |

* cited by examiner

*Primary Examiner* — Jeffrey Pwu
*Assistant Examiner* — Samuel Ambaye
(74) *Attorney, Agent, or Firm* — Bakerhostetler LLP (57) ABSTRACT

A system, method and device for controlling security of a beacon. The system includes a beacon device configured to broadcast a beacon identifier, and change the beacon identifier to another beacon identifier and to broadcast the other beacon identifier when a request to change the beacon identifier is received. The control device is configured to map and store the beacon identifier and service information and provide the service information to a terminal device that has received the beacon identifier and has accessed the control device. The control device also provides information on the other beacon identifier to replace the beacon identifier, and utilize the other beacon identifier to retrieve the service information for preventing an unauthorized user from changing information and enhance information security.

10 Claims, 4 Drawing Sheets

SYSTEM AND METHOD FOR CONTROLLING SECURITY OF BEACON AND CONTROL DEVICE THEREOF

CROSS-REFERENCE TO RELATED APPLICATION

This application claims priority to and the benefit of Korean Patent Application No. 10-2014-0033533 filed in the Korean Intellectual Property Office on Mar. 21, 2014, the entire contents of which are incorporated herein by reference.

TECHNICAL FIELD

The present invention relates to a beacon-based service provision technology, and more particularly, to a system and method for controlling security of a beacon and a control device thereof, which may prevent an unauthorized user from changing a variety of information without permission when the information is provided to a user terminal that communicates with the beacon via short-range wireless communication.

BACKGROUND

This section is intended to merely provide background for embodiments of the present invention and is not considered prior art in the claims.

With the development of mobile communication networks and the advance in terminal specifications, mobile communication terminals, such as a smart phone, have evolved into total information provision devices or total entertainment equipment beyond just simple communication devices.

Such mobile communication terminals have a function for performing short-range wireless communication, such as near field communication (NFC) or Bluetooth, in addition to a communication function through mobile communication networks.

NFC has a short communication distance and requires a separate wireless communication chip. However, Bluetooth has a relatively long communication distance and most terminals have a Bluetooth communication function equipped therein. Thus, various communication services are being developed using Bluetooth.

Further, service solutions for providing a variety of information to mobile communication terminals possessed by users are being developed using a beacon that utilizes Bluetooth communication. In this case, a mobile communication terminal receives a corresponding beacon identifier from a beacon and uses the beacon identifier to acquire a variety of information.

In this case, any unauthorized user may make the mobile communication terminal receive information that is set by the unauthorized user by acquiring the beacon identifier without permission and mapping the beacon identifier and any information desired by the unauthorized user. Accordingly, a method for preventing this is needed.

SUMMARY

The present invention is directed to providing a system and method for controlling security of a beacon and a control device thereof, which, when a variety of information is provided to a client's terminal that has received a beacon identifier broadcast by the beacon, may prevent an unauthorized user from changing the information provided to the client's terminal without permission.

One aspect of the present invention provides a device for controlling security of a beacon, the device including a communication unit configured to transmit and receive data; a storage unit configured to store a beacon identifier and corresponding service information, and a control unit configured to map and store, in the storage unit, the beacon identifier and the service information, provide the service information through the communication unit to a terminal device that has received the beacon identifier and has accessed the control device, request a beacon device broadcasting the beacon identifier to change the beacon identifier through the communication unit, map and store another beacon identifier and the service information, instead of the beacon identifier, when the beacon device changes the beacon identifier to the other beacon identifier, and provide the service information through the communication unit to a terminal device that has received the other beacon identifier and has accessed the control device.

The control unit may provide information on the other beacon identifier to the beacon device to request the beacon device to change the beacon identifier.

The control unit may receive information on the other beacon identifier from the beacon device to map the other beacon identifier and the service information.

The control unit may request the beacon device to change the beacon identifier periodically or as needed.

The service information may include at least one of an identifier of a shop where the beacon device is installed, an access address for acquiring detailed information, and app information on the terminal device provided with the service information.

The beacon identifier may include at least one of a unique identifier code for identifying service, a code for discerning franchises, and a code for identifying a location where the beacon device is installed.

Another aspect of the present invention provides a system for controlling security of a beacon, the system including: a beacon device configured to broadcast a beacon identifier, and when a request to change the beacon identifier is received, change the beacon identifier to another beacon identifier and broadcast the other beacon identifier; and a control device configured to map and store the beacon identifier and service information, provide the service information to a terminal device that has received the beacon identifier and has accessed the control device, request the beacon device to change the beacon identifier, map and store another beacon identifier and the service information, instead of the beacon identifier, and provide the service information to a terminal device that has received the other beacon identifier and has accessed the control device.

Still another aspect of the present invention provides a method of controlling security of a beacon, the method including: mapping, by a control device, a beacon identifier of a beacon device and service information and storing the mapped beacon identifier and service information; broadcasting, by the beacon device, the beacon identifier; providing, by the control device, the service information to a terminal device that has received the beacon identifier and has accessed the control device; requesting, by the control device, the beacon device to change the beacon identifier; changing, by the beacon device, the beacon identifier to another beacon identifier; mapping, by the control device, the other beacon identifier and the service information, instead of the beacon identifier and storing the mapped other beacon identifier and service information; and providing the service information to the terminal device that has received the beacon identifier and has accessed the control device.

The service information may include information on an access address for acquiring detailed information, and the method may further include accessing, by the terminal device that has received the service information from the control device, a content server using the access address to receive content.

Still another aspect of the present invention provides a method of controlling security of a beacon, the method including: mapping, by a control device, a beacon identifier of a beacon device and service information and storing the mapped beacon identifier and service information; providing, by the control device, the service information to a terminal device that has received the beacon identifier and has accessed the control device, providing, by the control device, information on another beacon identifier to the beacon device broadcasting the beacon identifier to request the beacon device to change the beacon identifier, mapping, by the control unit, the other beacon identifier and the service information, instead of the beacon identifier, and storing the mapped other beacon identifier and service information when the beacon device changes the beacon identifier to the other beacon identifier; and providing the service information to a terminal device that has received the other beacon identifier and has accessed the control device.

Still another aspect of the present invention provides a method of controlling security of a beacon, the method including: mapping, by a control device, a beacon identifier of a beacon device and service information and storing the mapped beacon identifier and service information; providing, by the control device, the service information to a terminal device that has received the beacon identifier and has accessed the control device, requesting, by the control device, the beacon device broadcasting the beacon identifier to change the beacon identifier, receiving, by the control device, information on another beacon identifier from the beacon device, mapping the other beacon identifier and the service information, instead of the beacon identifier, and storing the mapped other beacon identifier and service information when the beacon device changes the beacon identifier to the other beacon identifier, and providing, by the control device, the service information to a terminal device that has received the other beacon identifier and has accessed the control device.

Still another aspect of the present invention provides a computer-readable recording medium having a program recorded thereon for performing the method of controlling the security of the beacon.

According to the present invention, it is possible to prevent an unauthorized user from changing information intended to be provided through the beacon without permission, thus enhancing information security.

DETAILED DESCRIPTION

Hereinafter, it is noted that only parts necessary to understand exemplary embodiments of the present invention will be described, and description of other parts will be omitted to avoid obscuring the subject matter of the present invention.

The terms or words used in the specification and claims should not be construed as being limited to typical or dictionary meanings, but construed as the meaning and concept corresponding to the technical idea of the present invention on the basis of the principle that an inventor can appropriately define the concept of the term for describing his or her invention in the best method. Accordingly, the configurations illustrated in embodiments and drawings described in the specification do not represent the technical idea of the present invention but are just exemplary embodiments. Thus, it should be understood that various equivalents and modifications may have existed to replace them at a time when this specification was applied.

The present invention relates to a technology for preventing information that may be provided through a beacon from being changed by an unauthorized user without permission. Hereinafter, embodiments of the present invention will be described in detail with reference to the accompanying drawings.

Figure 1:
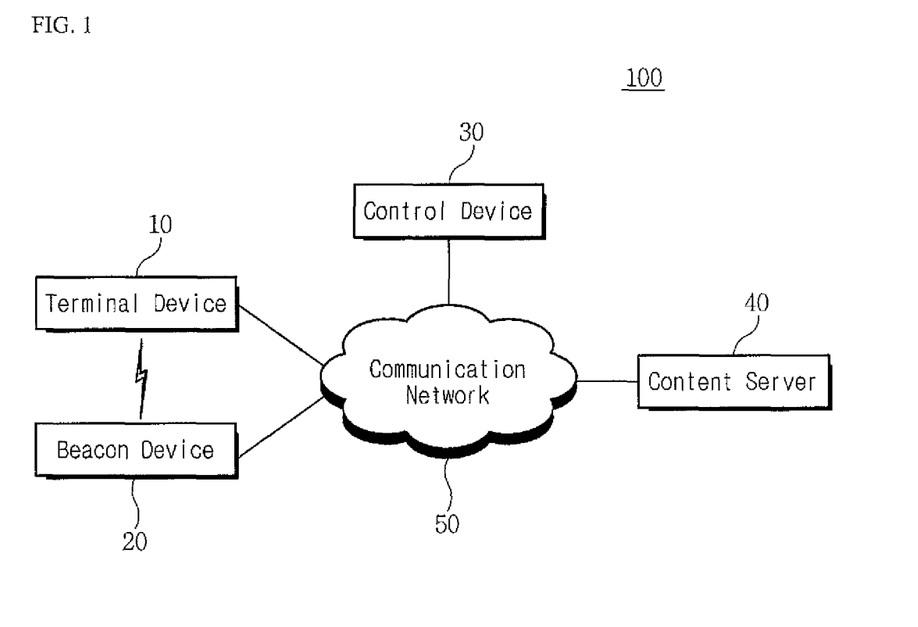
FIG. 1 is a block diagram showing a configuration of a control system according to an embodiment of the present invention.

FIG. 1 is a block diagram showing a configuration of a control system 100 according to an embodiment of the present invention.

Referring to FIG. 1, the control system 100 according to an embodiment of the present invention includes a terminal device 10, a beacon device 20, a control device 30, a content server 40, and a communication network 50.

The terminal device 10 is a terminal that may transmit and receive a variety of data via the communication network 50 according to a key manipulation of a user, and may include, but is not limited to, a smart phone, a tablet PC, a laptop, a personal computer (PC), a personal digital assistant (PDA), a smart TV, or a mobile communication terminal.

The terminal device 10 may perform voice or data communication using the communication network 50 and may include, but is not limited to, a browser for communicating with the control device 30 or the content server 40, a memory for storing a program and a protocol, and a microprocessor for performing an arithmetic operation and control by executing a variety of types of programs. That is, the terminal device 10 may be any terminal that may enable server-client communication with the control device 30 or content server 40 and also execute a customized service and may include all types of communication computing devices, such as a notebook computer, a mobile communication terminal, and a PDA, in a broader sense. The terminal device 10 preferably has a touch screen. However, the present invention is not limited thereto.

In this case, the terminal device 10 may communicate with the beacon device 20 using short-distance wireless communication such as Bluetooth and utilize Bluetooth low energy (BLE) communication technology (Bluetooth 4.0). The terminal device 10 scans a beacon signal from the beacon device 20 to receive a beacon identifier that is broadcast by the beacon device 20, and requests service information corresponding to the control device 30 using the received beacon identifier. The terminal device 10 may output the service information received from the control device 30 or may access the content server 40 using an access address included in the service information to receive detailed content and output the received detailed content.

The beacon device 20 is positioned in a shop that sells products and is configured to broadcast a beacon signal including its own beacon identifier to one or more terminal devices 10. In this case, the beacon device 20 may broadcast the beacon identifier using Bluetooth low energy (BLE) communication.

When a request to change the beacon identifier is received from the control device 30, the beacon device 20 changes the current beacon identifier to another beacon identifier on the basis of the request and broadcasts the other beacon identifier to the one or more terminal devices 10.

In this case, the beacon device 20 may receive information on the other beacon identifier from the control device 30 and utilize the received information to replace the beacon identifiers. In addition, when a request to change the beacon identifier is received from the control device 30, the beacon device 20 may change the current beacon identifier to another beacon identifier according to an internal setting and inform the control device 30 of information on the other beacon identifier.

The control device 30 serves to map and store a beacon identifier corresponding to the beacon device 20 and service information and then to provide the service information to the terminal device 10 that has received the beacon identifier from the beacon device 20. That is, when the beacon device 20 broadcasts a beacon identifier, the terminal device 10 receives the beacon identifier, transmits the received beacon identifier to the beacon device 20, and requests service information corresponding to the beacon identifier from the control device 30. The control device 30 retrieves the service information corresponding to the beacon identifier that is received from the terminal device 10, and provides the corresponding service information to the terminal device 10.

The control device 30 may request the beacon device 20 to change the beacon identifier, and thus the beacon device 20 may change the beacon identifier to another beacon identifier. In this case, the control device 30 may map and store the other beacon identifier and the service information, instead of the existing beacon identifier and then provide the service information to the terminal device 10 that has received the beacon identifier from the beacon device 20. The control device 30 may request the beacon device 20 to change the beacon identifier periodically, or as needed, thus preventing an unauthorized user who has acquired the existing beacon identifier from mapping and providing the existing beacon identifier and any service information without permission.

The content server 40 is a server device that serves to provide various types of content to the terminal device 10 that has received service information from the control device 30. For example, the service information provided by the control device 30 may include access address information, such as a uniform resource locator (URL), for acquiring detailed information from the content server 40, and the terminal device 10 may access the content server 40 to provide various types of content using the service information.

The communication network 50 includes a network and a communication infrastructure for information exchange and data communication among the terminal device 10, the beacon device 20, the control device 30, and the content server 40. The communication network 50 is a network capable of transmitting and receiving data using an Internet protocol in various wired/wireless communication technologies such as the Internet, the Intranet, a mobile communication network, a satellite communication network, etc. The communication network 50 includes networks using code division multiple access (CDMA), wideband code division multiple access (WCDMA), global system for mobile communications (GSM), long term evolution (LTE), evolved packet core (EPC), and others, next generation networks and computing networks, in addition to a closed network (for example, a local area network (LAN), a wide area network (WAN), etc.) and an open network (for example, the Internet).

Functions and operations of the control device 30 included in the control system according to an embodiment of the present invention will be described in detail with reference to FIG. 2.

Figure 2:
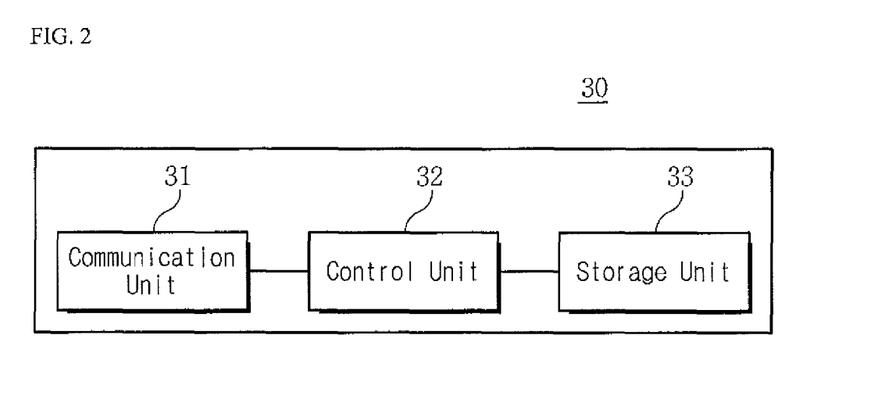
FIG. 2 is a block diagram showing a configuration of a control device according to an embodiment of the present invention.

FIG. 2 is a block diagram showing a configuration of a control device 30 according to an embodiment of the present invention.

Referring to FIGS. 1 and 2, the control device 30 according to an embodiment of the present invention includes a communication unit 31, a control unit 32, and a storage unit 33.

The communication unit 31 is configured to communicate data with the beacon device 20, the control device 30, or the content server 40 according to the control of the control unit 32. The communication unit 31 may communicate data in a wired or wireless manner or in any combination thereof, and include respective communication interfaces therefor. In an embodiment of the present invention, the communication unit 31 may include a communication interface for performing Bluetooth low energy communication with the beacon device 20 and a communication interface for performing communication with the control device 30 or the content server 40 over the communication network 50.

The storage unit 33 is configured to store the beacon identifier and the corresponding service information according to the control of the control unit 32. Examples of the storage unit 33 include a magnetic medium such as a hard disk, a floppy disk, and a magnetic tape, an optical medium such as a compact disk read only memory (CD-ROM) and a digital video disk (DVD), a magneto-optical medium such as a floptical disk, a read only memory (ROM), a random access memory (RAM), and a flash memory, etc.

The control unit 32 may serve to control overall operations of the control device including the communication unit 31 and the storage unit 33, and may include an arithmetic operation unit, an application program storage, and various types of memories.

In an embodiment of the present invention, the control unit 32 maps and stores, in the storage unit 33, the beacon identifier of the beacon device 20 and the service information. When the terminal device 10 receives the beacon identifier broadcast by the beacon device 20 and then transmits the beacon identifier to the control device 30, the control unit 32 performs control such that the beacon identifier is received through the communication unit 31, service information corresponding to the beacon identifier is retrieved from the storage unit 33, and the retrieved service information is provided to the terminal device 10 through the communication unit 31.

In this case, the beacon identifier includes at least one of a unique identifier code for identifying the service information provided to the terminal device 10, a code for discerning franchises, and a code for identifying a location where the beacon device 20 is installed. The control unit 32 may provide service information to the terminal device 10 with reference to the codes for the beacon identifier. In this case, the service information mapped to the beacon identifier may include at least one of an identifier of a shop where the beacon device 20 is installed, an access address for acquiring detailed information, and app information on the terminal device 10 provided with the service information.

The control unit 32 requests the beacon device 20 that broadcasts a beacon identifier to change the beacon identifier through the communication unit 31. This is intended to prevent an unauthorized user from acquiring the beacon identifier of the beacon device 20 and then mapping and providing the beacon identifier and other information without permission. The control unit 32 may request the beacon device 20 to change the beacon identifier periodically, or as needed, and at that time, a user may use a control tool to perform control such that a change request period is set or the change is directly applied.

When the request to change the beacon identifier is received, the beacon device 20 changes the beacon identifier to another beacon identifier. The control unit 32 re-maps and stores, in the storage unit 33, the other beacon identifier and the service information, instead of the previously stored beacon identifier.

When the beacon device 20 is requested to change the beacon identifier, the control unit 32 may provide information on the other beacon identifier to the beacon device, thereby allowing the beacon device 20 to use the information to change the beacon identifier. Alternatively, when the beacon device 20 is requested to change the beacon identifier, the beacon device 20 changes the beacon identifier to the other beacon identifier according to an internal setting and then transmits information on the changed beacon identifier to the control device 30. The control unit 32 may receive the information on the other beacon identifier from the beacon device 20 and perform mapping of the other beacon identifier and service information.

Subsequently, when the terminal device 10 receives the other beacon identifier broadcast by the beacon device 20 and then transmits the other beacon identifier to the control device 30, the control unit 32 performs control such that the beacon identifier is received through the communication unit 31, service information corresponding to the beacon identifier is retrieved from the storage unit 33, and the retrieved service information is provided to the terminal device 10 through the communication unit 31.

Security control methods for a beacon according to embodiments of the present invention will be described in detail below with reference to FIGS. 3 to 5.

Figure 3:
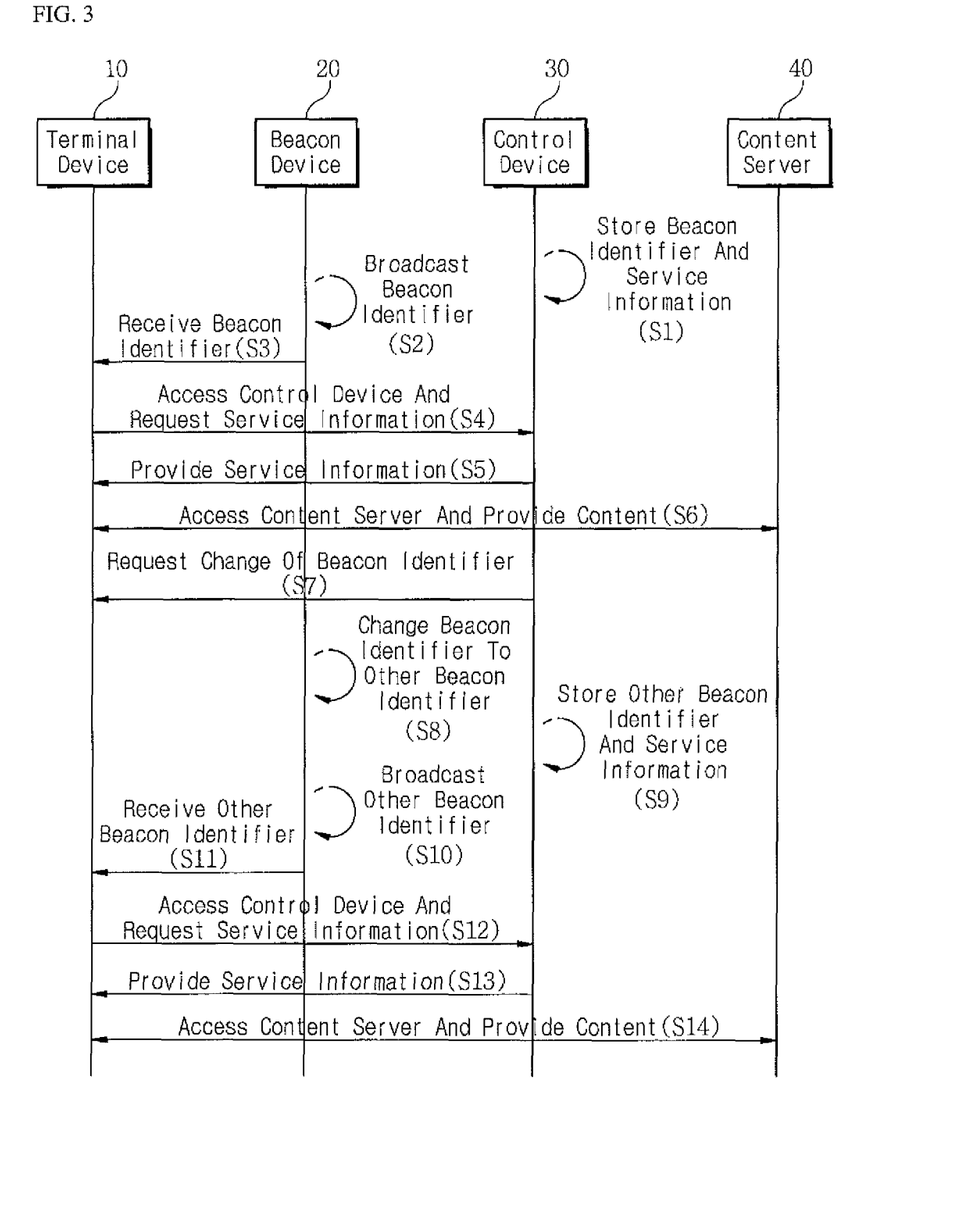
FIG. 3 is a sequence diagram showing a control method according to an embodiment of the present invention.

FIG. 3 is a sequence diagram showing a control method according to an embodiment of the present invention.

Referring to FIG. 3, the control device 30 maps a beacon identifier of the beacon device 20 and service information and stores the mapped beacon identifier and service information therein in operation S1.

In operation S1, the beacon identifier stored in the control device 30 may include at least one of a unique identifier code for identifying service to be provided to the terminal device 10, a code for discerning franchises, and a code for identifying a location where the beacon device 20 is installed.

Further, the service information mapped to the beacon identifier may include at least one of an identifier of a shop where the beacon device 20 is installed, an access address for acquiring detailed information, and app information on the terminal device 10 provided with the service information.

And then, the beacon device 20 broadcasts a beacon signal including its own beacon identifier in operation S2, and the terminal device 10 scans the beacon signal to receive the beacon identifier in operation S3.

When the beacon identifier is received in operation S3, the terminal device 10 accesses the control device 30 and transmits the beacon identifier to request corresponding service information in operation S4.

The control device 30 retrieves the service information stored in operation S1 using the beacon identifier received in operation S4 and provides the retrieved service information to the terminal device 10 in operation S5.

In operation S5, the service information received by the terminal device 10 may include access address information for acquiring detailed information related to the beacon identifier, and the terminal device 10 accesses the content server 40 using the access address information and receives a variety of content in operation S6.

The control device 30 requests the beacon device 20 to change the existing beacon identifier in operation S7.

In this case, the change request in operation S7 may be made periodically or as needed.

When the change request is received in operation S7, the beacon device 20 changes the existing beacon identifier to another beacon identifier. In respond to this, in operation S9, the control device 30 maps and stores the other beacon identifier and the service information, instead of the beacon identifier stored in operation S1.

The beacon identifier changing process in operation S8 and the mapping process in operation S9 may be performed in a different order or at the same time.

And then, the beacon device 20 broadcasts a beacon signal including the other beacon identifier in operation S10, and the terminal device 10 scans the beacon signal to receive the other beacon identifier in operation S11.

When the other beacon identifier is received in operation S11, the terminal device 10 accesses the control device 30 and transmits the other beacon identifier to request corresponding service information in operation S12.

The control device 30 retrieves the service information stored in operation S1 using the beacon identifier received in operation S12 and provides the service information to the terminal device 10 in operation S13.

In operation S13, the service information received by the terminal device 10 may include access address information for acquiring detailed information related to the beacon identifier, and the terminal device 10 accesses the content server 40 using the access address information and receives a variety of content in operation S14.

Figure 4:
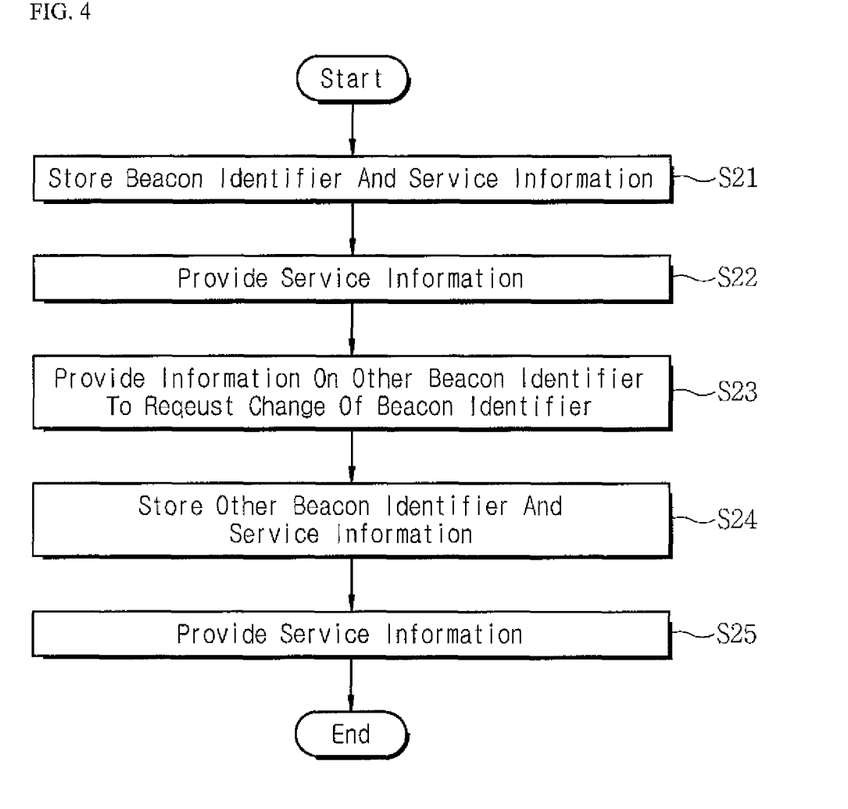
FIG. 4 is a flowchart showing a control method according to another embodiment of the present invention.

FIG. 4 is a view showing a control method according to another embodiment of the present invention.

Referring to FIG. 4, a control device maps a beacon identifier of a beacon device and corresponding service information and stores the mapped beacon identifier and service information therein in operation S21.

The control device provides the service information stored in the operation S21 to a terminal device that has received the beacon identifier broadcast by the beacon device and has accessed the control device in operation S22.

In operation S22, the control device may receive the beacon identifier from the terminal device and utilize the beacon identifier to retrieve the service information stored in the operation S21.

Subsequently, the control device provides information on another beacon identifier to replace the beacon identifier to the beacon device and requests the beacon device to change the existing beacon identifier in operation S23.

In operation S24, the control device maps and stores the other beacon identifier provided in operation S23 and the service information, instead of the beacon identifier stored in operation S21.

The control device provides the service information stored in the operation S24 to the terminal device that has received the other beacon identifier broadcast by the beacon device and has accessed the control device in operation S25.

In operation S25, the control device may receive the other beacon identifier from the terminal device and utilize the other beacon identifier to retrieve the service information stored in the operation S24.

Figure 5:
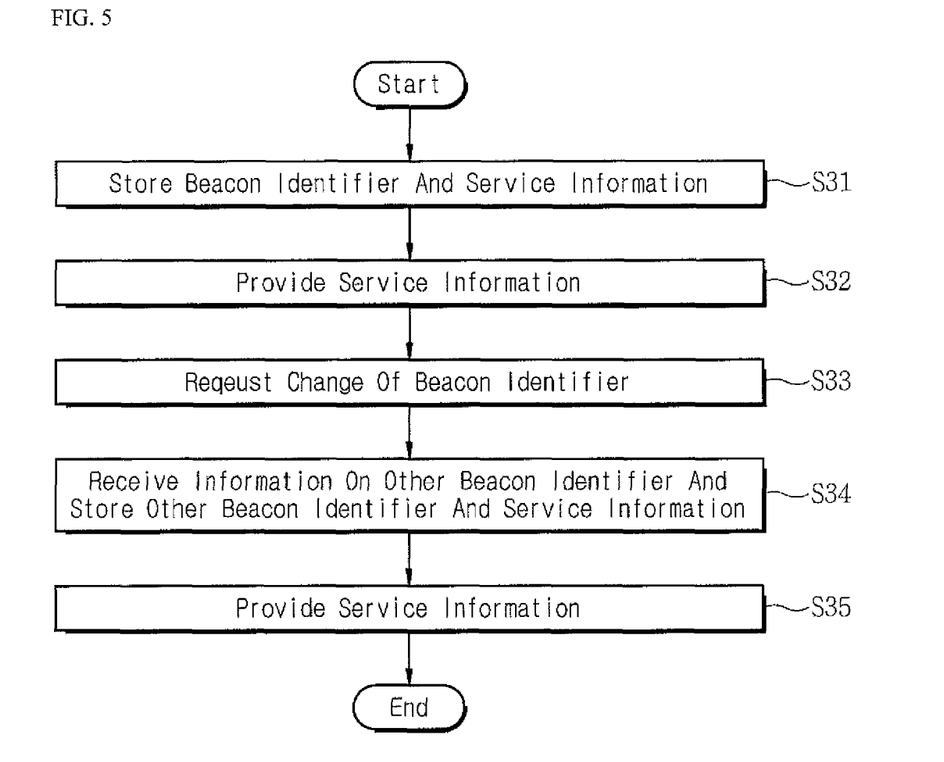
FIG. 5 is a flowchart showing a control method according to still another embodiment of the present invention.

FIG. 5 is a view showing a control method according to still another embodiment of the present invention.

Referring to FIG. 5, a control device maps a beacon identifier of a beacon device and corresponding service information and stores the mapped beacon identifier and service information therein in operation S31.

The control device provides the service information stored in the operation S31 to a terminal device that has received the beacon identifier broadcast by the beacon device and has accessed the control device in operation S32.

In operation S32, the control device may receive the beacon identifier from the terminal device and utilize the beacon identifier to retrieve the service information stored in the operation S31.

Subsequently, the control device requests the beacon device to change the existing beacon identifier to another beacon identifier in operation S33.

In operation S34, the control unit receives information on the other beacon identifier from the beacon device that has changed the existing beacon identifier to the other beacon identifier and maps and stores the other beacon identifier and the service information, instead of the beacon identifier stored in operation S31.

The control device provides the service information stored in the operation S34 to the terminal device that has received the other beacon identifier broadcast by the beacon device and has accessed the control device in operation S35.

In operation S35, the control device may receive the other beacon identifier from the terminal device and utilize the other beacon identifier to retrieve the service information stored in the operation S34.

The security control method for the beacon according to an embodiment of the present invention may be implemented in the form of a program that is readable by various computer means and may be recorded on a computer readable medium.

It should be understood that the embodiments disclosed herein are merely illustrative and are not intended to limit the scope of the invention. It will be obvious to those skilled in the art that various modifications can be made to the above-described exemplary embodiments of the present invention without departing from the spirit or scope of the invention. While preferred embodiments of the present invention have been described using specific terms, such description is for illustrative purposes only, and it is to be understood that changes and variations may be made without departing from the spirit or scope of the following claims.

What is claimed is:

1. A device for controlling security of a beacon, the device comprising:
   a communication unit that transmits and receives data;
   a storage unit that stores a beacon identifier and corresponding service information; and
   a control unit that maps and stores, in the storage unit, the beacon identifier and the service information, provides the service information through the communication unit to a terminal device that has received the beacon identifier, and controls changing of the beacon identifier by providing information on another beacon identifier to the beacon device broadcasting the beacon identifier to change the beacon identifier in response to a request from said control unit, maps and stores the another beacon identifier and the service information, instead of the beacon identifier, when the beacon device changes the beacon identifier to the another beacon identifier, and provides the service information through the communication unit to a terminal device that has received the another beacon identifier and has accessed the control device.

2. The device of claim 1, wherein the control unit receives information on the other beacon identifier from the beacon device to map the other beacon identifier and the service information.

3. The device of claim 1, wherein the control unit requests the beacon device to change the beacon identifier periodically or as needed.

4. The device of claim 1, wherein the service information includes at least one of an identifier of a shop where the beacon device is installed, an access address for acquiring detailed information, and app information on the terminal device provided with the service information.

5. The device of claim 1, wherein the beacon identifier includes at least one of a unique identifier code for identifying service, a code for discerning franchises, and a code for identifying a location where the beacon device is installed.

6. The device of claim 1, wherein the control unit maps and stores the beacon identifier of the beacon device and the service information, provides the service information to the terminal device that has received the beacon identifier and has accessed the control device, requests the beacon device broadcasting the beacon identifier to change the beacon identifier, receives information on the other beacon identifier from the beacon device to map and store the other beacon identifier and the service information, instead of the beacon identifier, when the beacon device changes the beacon identifier to the other beacon identifier, and provides the service information to the terminal device that has received the other beacon identifier and has accessed the control device.

7. A system for controlling security of a beacon, the system comprising:
   a beacon device configured to broadcast a beacon identifier, to change the beacon identifier to another beacon identifier in response to a request from a control device to change the beacon identifier to another beacon identifier and to broadcast the other beacon identifier; and
   wherein said control device is configured to map and store the beacon identifier and service information, provide the service information to a terminal device that has received the beacon identifier and has accessed the control device, to provide information on the other beacon identifier to the beacon device for broadcasting the other beacon identifier in response to the request from the control device to change the beacon identifier, map and store the other beacon identifier and the service information, instead of the beacon identifier, and provide the service information to a terminal device that has received the other beacon identifier and has accessed the control device.

8. A method of controlling security of a beacon, the method comprising:

mapping, by a control device, a beacon identifier of a beacon device and service information and storing the mapped beacon identifier and service information;

broadcasting, by the beacon device, the beacon identifier;

providing, by the control device, the service information to a terminal device that has received the beacon identifier and has accessed the control device;

providing, by the control device, information on another beacon identifier to the beacon device broadcasting the beacon identifier to change the beacon identifier upon receipt of a request from the control device, changing, by the beacon device, the beacon identifier to the another beacon identifier;

mapping, by the control device, the another beacon identifier and the service information, instead of the beacon identifier and storing the mapped another beacon identifier and service information; and providing the service information to the terminal device that has received the another beacon identifier and has accessed the control device.

9. The method of claim 8, wherein the service information includes information on an access address for acquiring detailed information, and further comprising accessing, by the terminal device that has received the service information from the control device, a content server using the access address to receive content.

10. A non-transitory computer-readable recording medium having a program recorded thereon for performing the method of claim 8.

* * * * *